(12) United States Patent
Iwatschenko-Borho et al.

(10) Patent No.: US 10,527,743 B2
(45) Date of Patent: Jan. 7, 2020

(54) SYSTEM AND METHOD OF NEUTRON RADIATION DETECTION

(71) Applicant: THERMO FISHER SCIENTIFIC MESSTECHNIK GMBH, Erlangen (DE)

(72) Inventors: Michael Iwatschenko-Borho, Roettenbach (DE); Erich Leder, Heroldsbach (DE); Ralf Pijahn, Erlangen (DE); Norbert Trost, Erlangen (DE); Reinhard Buchhold, Erlangen (DE)

(73) Assignee: THERMO FISHER SCIENTIFIC MESSTECHNIK GMBH, Erlangen (DE)

( * ) Notice: Subject to any disclaimer, the term of this patent is extended or adjusted under 35 U.S.C. 154(b) by 74 days.

(21) Appl. No.: 15/812,012

(22) Filed: Nov. 14, 2017

(65) Prior Publication Data
US 2019/0025445 A1   Jan. 24, 2019

Related U.S. Application Data

(60) Provisional application No. 62/422,168, filed on Nov. 15, 2016.

(51) Int. Cl.
*G01T 3/06* (2006.01)
*C09K 11/55* (2006.01)
*C09K 11/61* (2006.01)
*G01T 1/202* (2006.01)

(52) U.S. Cl.
CPC ............... *G01T 3/06* (2013.01); *C09K 11/55* (2013.01); *C09K 11/61* (2013.01); *G01T 1/2023* (2013.01)

(58) Field of Classification Search
CPC ......... G01T 3/06; G01T 1/2023; C09K 11/55; C09K 11/61
See application file for complete search history.

(56) References Cited

U.S. PATENT DOCUMENTS

| | | |
|---|---|---|
| 7,405,404 B1 | 7/2008 | Shah |
| 7,456,405 B1 | 11/2008 | Iwatschenko-Borho et al. |
| 8,658,983 B2 | 2/2014 | Achtzehn et al. |

(Continued)

FOREIGN PATENT DOCUMENTS

| | | |
|---|---|---|
| WO | 2011012155 A1 | 3/2011 |
| WO | WO2014136990 A1 | 9/2014 |

OTHER PUBLICATIONS

Galy and Magill, "Nuclides 2000: An Electronic Chart of the Nuclides," European Commission, Joint Research Centre, Institute for Transuranium Elements, Postfach 2340, D-76125 Karlsruhe, Germany, 2 pgs., 2000.

(Continued)

*Primary Examiner* — Christine S. Kim
(74) *Attorney, Agent, or Firm* — William R. McCarthy, III (57) ABSTRACT

A gamma radiation detecting device includes a scintillation detector that detects gamma radiation, the detector comprising a scintillation material that includes an element that creates, by neutron activation of the element, an isotope that emits gamma radiation, and a processor configured to monitor the gamma radiation emitted by the isotope, thereby detecting exposure of the gamma radiation detecting device to neutron radiation.

22 Claims, 10 Drawing Sheets

(56) References Cited

U.S. PATENT DOCUMENTS

| | | | | |
|---|---|---|---|---|
| 2006/0284122 | A1* | 12/2006 | Caldwell | G21F 1/085 250/515.1 |
| 2010/0038551 | A1* | 2/2010 | Bell | G01T 3/00 250/390.12 |
| 2010/0327170 | A1* | 12/2010 | Ivan | G01T 3/085 250/370.05 |
| 2011/0266451 | A1 | 11/2011 | Achtzehn et al. | |
| 2012/0074326 | A1* | 3/2012 | Pausch | G01T 3/00 250/362 |
| 2014/0319330 | A1 | 10/2014 | Berheide et al. | |
| 2017/0125625 | A1* | 5/2017 | Cauffiel | H01L 31/115 |

OTHER PUBLICATIONS

Technical Report Series No. 156, Handbook on Nuclear Activation Cross-Sections, International Atomic Energy Agency, Vienna, 1974, 572 pgs.

International Preliminary Report on Patentability for International Application No. PCT/EP2017/079127dated May 31, 2019, 7 pages.

* cited by examiner

SYSTEM AND METHOD OF NEUTRON RADIATION DETECTION

CROSS-REFERENCE TO RELATED APPLICATION

This application claims the benefit of U.S. provisional patent application No. 62/422,168, filed Nov. 15, 2016. The contents of this application are incorporated herein by reference in its entirety.

FIELD OF THE INVENTION

The present invention is generally directed to neutron radiation detection.

BACKGROUND

The search for hidden radioactive material or the sensitive characterization of the radiation field created, for example, by a nuclear research facility is often performed by mobile, portable, and wearable instruments that contain very sensitive scintillation detectors. Such instruments are typically designed solely for the detection and spectroscopic analysis of gamma radiation using scintillator materials such as NaI(Tl), CsI(Tl), LaBr$_3$(Ce), CeBr$_3$, even though the detection of neutron radiation may also be desirable, in order to cover scenarios where dangerous and highly radiotoxic material, such as Plutonium or industrial neutron sources (e.g., AmBe or Cf-252) have been heavily gamma shielded or been masked by other radioactive material. However, instruments that are designed for both gamma and neutron radiation detection are significantly more expensive. Additional inconvenience and cost of ownership often arises by the need to calibrate the additional neutron detector. Examples for such detectors are gas filled proportional counter tubes with He-3, B-10 gas, or B-10 wall coating. Neutron sensitive scintillation detectors containing Li-6 are also known, such as LiI(Eu). Recently, gamma/neutron spectroscopic crystals such as Ce-doped Cs$_2$LiYCl$_6$ ("CLYC") or Cs$_2$LiLaBr$_6$ ("CLLB") have become available. These scintillation detectors are dedicated for spectroscopic gamma measurement and neutron detection, but instruments based on these crystals may become unable to detect neutron radiation in the presence of high intensity gamma fields.

Neutron activation analysis is a well-known technique to determine the concentration of trace elements in a sample. For conventional neutron activation analysis, the sample material is first exposed to a high neutron fluence rate, and then taken out of the neutron field and placed next to a spectroscopic gamma detector. The delayed gamma radiation of radio isotopes that were generated by neutron capture or other neutron induced nuclear reactions is measured and analyzed to determine the concentration of certain elements. Inverting the purpose of the measurement, neutron fluence measurements can be performed by irradiating a known metal foil in a neutron field of unknown strength. Disadvantages of this method include the need to actively perform these measuring steps, the limited detection sensitivity for low exposure scenarios, and the potential radiation exposure of the user handling the target material in high exposure scenarios.

Figure 1:
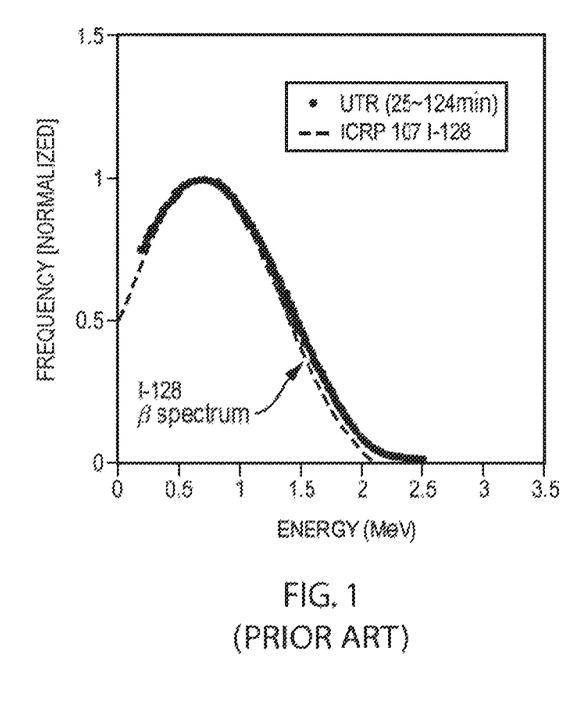
FIG. 1 is a plot of frequency (counts) as a function of energy (Mev) of the β spectrum of I-128 of a prior art neutron detection method.

A scintillator material containing Iodine has recently been used for measurement of pulsed neutron radiation. See PCT Application PCT/JP2014/056812 of Nohtomi et al, published as WO 2014136990 A1, hereby incorporated by reference in its entirety (however, where anything in the incorporated reference contradicts anything stated in the present application, the present application prevails). Here, 1-128 was generated by neutron capture and the emitted beta radiation was absorbed in the scintillator crystal and detected. The limitation and disadvantage of this technique can be seen in FIG. 1 in the wide and continuous distribution of beta energies ranging from 0 to approximately 2 MeV, due to the decay energy being shared between an ionizing particle (electron) and a non-ionizing particle (anti-neutrino). Thus, it is difficult to distinguish the induced radioactivity from the background radiation in, for example, low exposure scenarios. Furthermore, this method is limited to scintillation crystals containing Iodine, such as NaI(Tl) or CsI(Tl).

Therefore, there is a need for further improvements in detection of neutron radiation by neutron activation of scintillator materials.

SUMMARY

In one embodiment, a gamma radiation detecting device includes a scintillation detector that detects gamma radiation, the detector comprising a scintillation material that includes an element that creates, by neutron activation of the element, an isotope that emits gamma radiation, and a processor configured to monitor the gamma radiation emitted by the isotope, thereby detecting exposure of the gamma radiation detecting device to neutron radiation. In some embodiments, the element can be bromine (Br). In these specific embodiments, the isotope can include Br-80m and Br-82m. In certain embodiments, the isotope can further include Br-80 and Br-82, with the processor being further configured to monitor beta radiation emitted by the Br-80 and Br-82 isotopes. In certain other embodiments, the element can be (Cs). In these specific embodiments, the isotope can include Cs-134m. In certain embodiments, the isotope can further include Cs-134, with the processor being further configured to monitor beta radiation emitted by the Cs-134 isotope. The processor can be further configured to monitor persistent gamma radiation emitted by the isotope after exposure of the gamma radiation detecting device to neutron radiation.

In some embodiments, the processor can be further configured to monitor a predetermined energy gamma radiation emitted by the isotope. In certain embodiments, the element can be bromine (Br). In these specific embodiments, the isotope can be Br-82m, with the energy of the gamma radiation emitted by the Br-82m isotope being 48 keV, or the isotope can be Br-80m, with the energy of the gamma radiation emitted by the Br-80m isotope being 85 keV. In certain other embodiments, the element can be cesium (Cs). In these specific embodiments, the isotope can be Cs-134m, with the energy of the gamma radiation emitted by the Cs-134m isotope being 140 keV.

In certain embodiments, the device can further include a neutron moderator device in direct contact with the gamma radiation detecting device. The neutron moderator device can include at least one of polyethylene (PE), polyvinylchloride (PVC), polymethylmethacrylate (PMMA), and water.

In another embodiment, a method of detecting neutron radiation includes detecting gamma radiation using a gamma radiation detecting device that includes a scintillation detector that detects gamma radiation, the detector comprising a scintillation material that includes an element that creates, by neutron activation of the element, an isotope that emits gamma radiation, and monitoring the gamma radiation emitted by the isotope, thereby detecting exposure of the gamma radiation detecting device to neutron radiation. In some embodiments, the element can be bromine (Br). In these specific embodiments, the isotope can include Br-80m and Br-82m. In certain embodiments, the isotope can further include Br-80 and Br-82, with the monitoring step including monitoring beta radiation emitted by the Br-80 and Br-82 isotopes. In certain other embodiments, the element can be (Cs). In these specific embodiments, the isotope can include Cs-134m. In certain embodiments, the isotope can further include Cs-134, with the monitoring step including monitoring beta radiation emitted by the Cs-134 isotope. The monitoring step can include monitoring persistent gamma radiation emitted by the isotope after exposure of the gamma radiation detecting device to neutron radiation.

In some embodiments, the monitoring step can include monitoring a predetermined energy gamma radiation emitted by the isotope. In certain embodiments, the element can be bromine (Br). In these specific embodiments, the isotope can be Br-82m, with the energy of the gamma radiation emitted by the Br-82m isotope being 48 keV, or the isotope can be Br-80m, with the energy of the gamma radiation emitted by the Br-80m isotope being 85 keV. In certain other embodiments, the element can be cesium (Cs). In these specific embodiments, the isotope can be Cs-134m, with the energy of the gamma radiation emitted by the Cs-134m isotope being 140 keV.

In certain embodiments, the method can further include placing the gamma radiation detecting device in direct contact with a neutron moderator device. The neutron moderator device can include at least one of polyethylene (PE), polyvinylchloride (PVC), polymethylmethacrylate (PMMA), and water. In some embodiments, the method can further include enclosing the gamma radiation detecting device in a gamma shielding enclosure comprising a high atomic number material. The high atomic number material can be at least one of lead (Pb), tin (Sn), or Tungsten (W).

The invention has many advantages, including enabling detection of neutron radiation with a spectroscopic personal radiation detector without a dedicated neutron detector.

BRIEF DESCRIPTION OF THE DRAWINGS

Like reference numerals refer to corresponding parts throughout the several views of the drawings.

DETAILED DESCRIPTION OF EMBODIMENTS

In the description of the invention herein, it is understood that a word appearing in the singular encompasses its plural counterpart, and a word appearing in the plural encompasses its singular counterpart, unless implicitly or explicitly understood or stated otherwise. Furthermore, it is understood that for any given component or embodiment described herein, any of the possible candidates or alternatives listed for that component may generally be used individually or in combination with one another, unless implicitly or explicitly understood or stated otherwise. Moreover, it is to be appreciated that the figures, as shown herein, are not necessarily drawn to scale, wherein some of the elements may be drawn merely for clarity of the invention. Also, reference numerals may be repeated among the various figures to show corresponding or analogous elements. Additionally, it will be understood that any list of such candidates or alternatives is merely illustrative, not limiting, unless implicitly or explicitly understood or stated otherwise. In addition, unless otherwise indicated, numbers expressing quantities of ingredients, constituents, reaction conditions and so forth used in the specification and claims are to be understood as being modified by the term "about."

Accordingly, unless indicated to the contrary, the numerical parameters set forth in the specification and attached claims are approximations that may vary depending upon the desired properties sought to be obtained by the subject matter presented herein. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the subject matter presented herein are approximations, the numerical values set forth in the specific examples are reported as precisely as possible. Any numerical values, however, inherently contain certain errors necessarily resulting from the standard deviation found in their respective testing measurements.

A method is described herein to use a spectroscopic personal radiation detector (SPRD) to determine the presence and intensity of neutron radiation without a dedicated neutron detector, using the intrinsic self-activation of the gamma spectroscopic scintillation crystal that is an integral part of the gamma spectroscopic radiation detecting device. A reliable solution is thereby provided for detection of, for example, high intensity radiation events of very short duration (pulses on the order of milliseconds or less), where classic active detectors based on He-3, Li-6 or B-10 or the new (e.g., CLYC or CLLB) gamma/neutron discriminating materials may become overloaded.

In the method described herein, the response of a gamma spectroscopic scintillation detector with respect to the pulse height shape and time dependency during and after exposure to a neutron radiation field is analyzed and a warning message for the presence of neutrons is generated. The method is based on the induced radioactivity caused by neutron activation in gamma spectroscopic scintillator materials containing bromine or cesium. The method can be applied to continuous or pulsed neutron radiation. Calibration and performance verification of this neutron detecting device does not require a neutron source, but can be verified by using gamma radiation.

Neutron activation of crystals containing bromine or cesium does not require extra materials nor extra measurement steps and does not cause any additional radioactive exposure: bromine or cesium atoms that are part of the gamma detector are activated in a neutron field. The emitted delayed radiation, caused by the radioactive decay of the created radioactive atom, is of very short range and thus nearly completely absorbed in the scintillation crystal. This method therefore extends the usage of conventional spectroscopic gamma scintillation detectors, such as CsI(Tl), LaBr$_3$ or CeBr$_3$, to the detection of low energy neutrons, without the use of extra target material. The method can be applied during or after exposure to a radioactive source, with post-exposure application enabling detection of pulsed radiation fields of short duration and high intensity. For that purpose, the pulse height spectrum of the induced intrinsic radioactivity in the scintillation detector itself, caused by neutron activation of cesium or bromine, is analyzed. In conjunction with the spectral analysis, the time change of the spectrum during the measurement can be analyzed to gain additional detection sensitivity.

The self-activation of a scintillation crystal containing bromine or cesium, or both, can be used for the detection of low energy neutrons. During the neutron activation, at least two isotopes are created: one isotope decays by emission of a high energy beta particle and an anti-neutrino, the other isotope decays from an isomeric state to the ground state by low energy photon and electron emission. Both kinds of radiation are highly ionizing with an associated short range, so that nearly all decay events are registered in the crystal. Since their relative production rate and decay time is known, the presence and decay behavior can be used to detect the presence of neutrons, and determine the thermal neutron fluence and fluence rate for both pulsed and continuous neutron radiation.

The nuclear decay characteristics described above can be found in scintillator materials used for gamma spectroscopy that contain Br or Cs: bromine consists of 2 stable isotopes: Br-79 (50.7% natural abundance) and Br-81 (49.3% natural abundance). When bromine is exposed to neutron radiation, radioactive isotopes Br-80m, Br-80, Br-82, and Br-82m are generated by neutron capture. cesium has only 1 stable isotope, Cs-133, and radioactive Cs-134 and Cs-134m are produced by neutron activation.

Tables 1 and 2 summarize the relevant nuclear properties of bromine and cesium, respectively. Activation cross sections were taken from IAEA technical report 156, hereby incorporated by reference in its entirety (however, where anything in the incorporated reference contradicts anything stated in the present application, the present application prevails). Other nuclear data were taken from NUCLIDES 2000—An Electronic Chart of the Nuclides on CD, ITU Karlsruhe, 1999, hereby incorporated by reference in its entirety (however, where anything in the incorporated reference contradicts anything stated in the present application, the present application prevails).

TABLE 1

Nuclear properties of activation products in a scintillator containing bromine

| Activation Product | Activation Cross Section (barn) | Half life (min) | Main low energy gamma radiation (<200 keV) | Beta max (keV) | Main daughter product |
|---|---|---|---|---|---|
| Br-80m | 2.6 | 265 | 85 | | Br-80 |
| Br-80 | 8.4 | 17.4 | | 2000 | Kr-80 stable |
| Br-82m | 2.7 | 6.1 | 48 | | Br-82 |
| Br-82 | 3.0 | 2117 | | 440 | Kr-82 stable |

TABLE 2

Nuclear properties of activation products in a scintillator containing cesium

| Activation Product | Activation Cross Section (barn) | Half life (min) | Main low energy gamma radiation (<200 keV) | Beta max (keV) | Main daughter product |
|---|---|---|---|---|---|
| Cs134m | 2.6 | 174 | 140 | | Cs-134 |
| Cs-134 | 30 | 1.1E6 | | 660 | Ba-134 stable |

Figure 2:
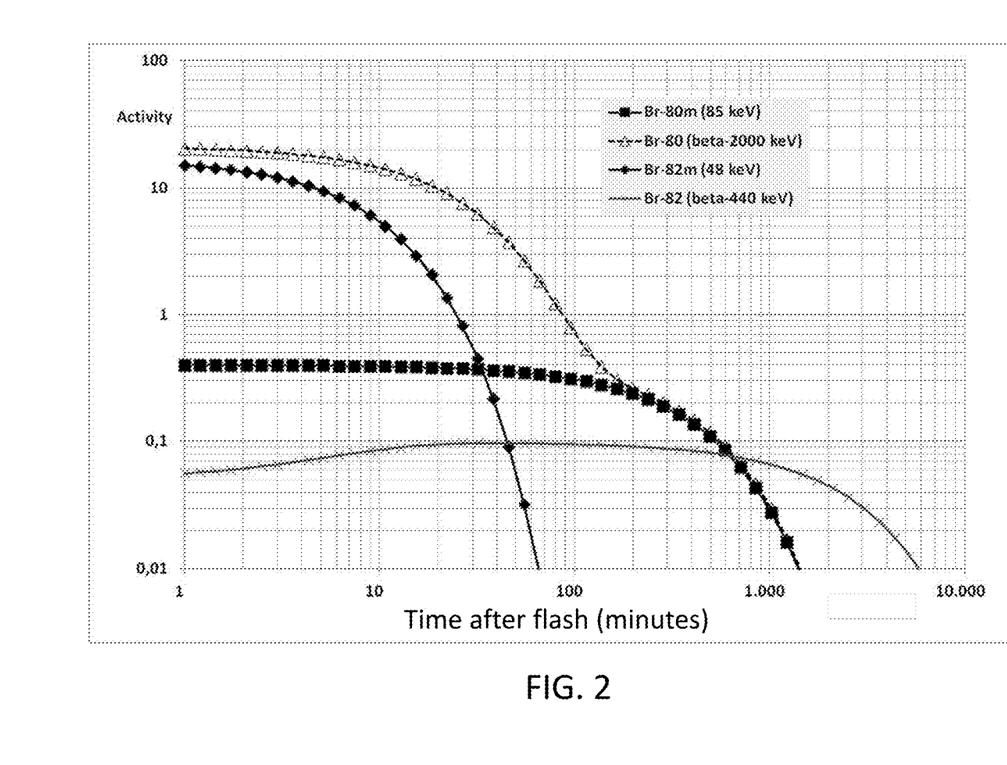
FIG. 2 is a graph of decay of induced activity in bromine (arbitrary units) as a function of time (minutes) after a neutron irradiation of short duration (flash) of a $CeBr_3$ scintillation crystal.

Tables 1 and 2 show that bromine is the preferred element over cesium in a scintillator crystal, due to the much higher initial activity and the related higher neutron detection sensitivity. The 48 keV peak of Br-82m and the beta spectrum originating from Br-80 determine the sensitivity of this method for short time irradiation. FIG. 2 shows time dependence of the intrinsic specific activity of bromine isotopes after a 1 s neutron irradiation (arbitrary activity units).

Figure 3A:
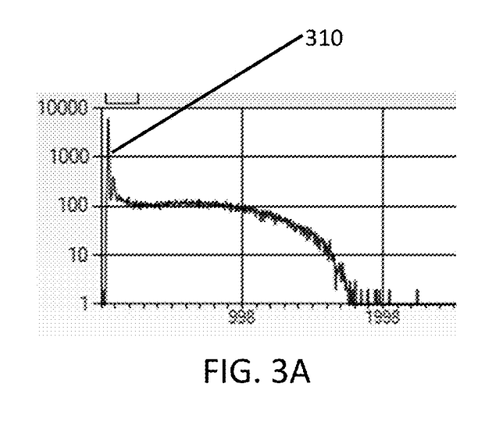
FIG. 3A is a graph of a pulse height spectrum 15 minutes after neutron irradiation of a $CeBr_3$ scintillation crystal.
Figure 3B:
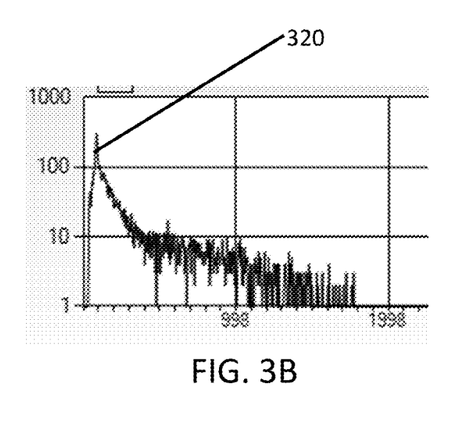
FIG. 3B is a graph of a pulse height spectrum 2 hours after neutron irradiation of a $CeBr_3$ scintillation crystal.

Considering the low background count rate in the small energy range between approximately 35 keV and 65 keV, which is used to quantify Br-82m, the analysis of Br-82m provides the highest detection sensitivity during the first half hour, as shown in FIG. 3A, while later on, the combined presence of the beta spectrum (up to 2 MeV) and the count rate in the range between approximately 70 keV and 100 keV (Br-80) can be used, as shown in FIG. 3B.

Such clean and unambiguous spectra can typically only be obtained in a low gamma background, that is, if the instrument has been removed from the radiation field and placed into a suitable gamma shielded enclosure. However, it can be seen that masking of the neutron activation impact will not work for most industrial and medical isotopes, which typically emit radiation in the range of only up to several hundred keV, and thus the Br-80 high energy part of the spectrum will still be detectable.

Figure 4:
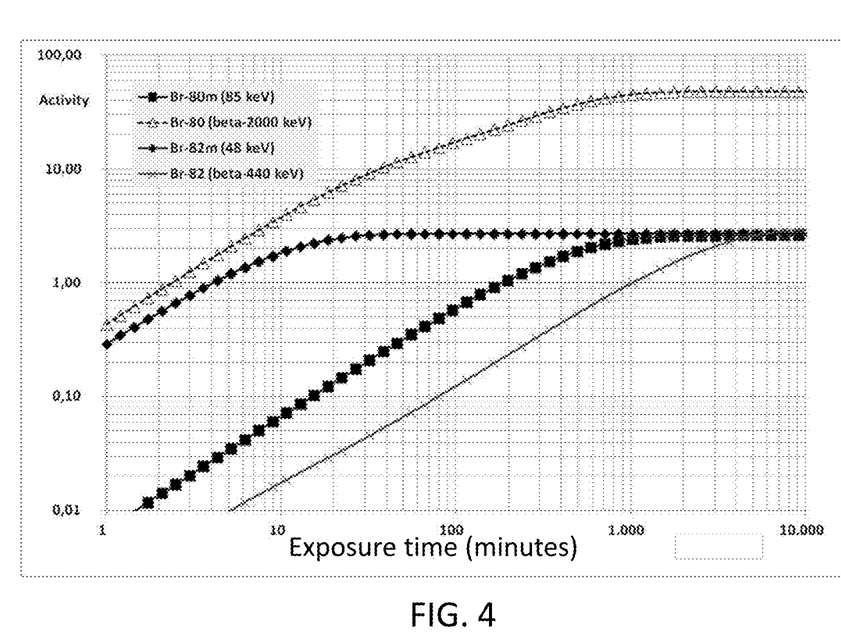
FIG. 4 is a graph of in-growth of induced activity (arbitrary units) as a function of time (minutes) during constant neutron irradiation of a $CeBr_3$ scintillation crystal.

While FIG. 2 shows the decay of the induced activity after a short neutron exposure with a high fluence rate, FIG. 4 shows the expected in-growth of the induced activity of bromine isotopes during a continuous irradiation. Note that the time for the in-growth of the Br-80m and Br-82m gamma radiation corresponds to a convenient measurement time of a few (e.g., 5-10 or more) minutes for a gamma spectroscopic measurement in the field.

One illustrative use case can be directly deduced from FIG. 4: instead of measuring a spectrum over the full time of 10 minutes, for example, the count rate and spectral shape can be compared for a first and second sub-spectrum of 5 minutes each. For a fixed source and detector position, the net contribution of Br-82m and Br-80m increases linearly in time after start of the exposure. Thus, the expected average contribution for the first 5 minutes corresponds to an activation time of 2.5 minutes and for the second interval the activation time is 7.5 minutes. That is, the net counts in the second time interval are expected to be nearly 3 times larger than in the first time interval for a constant neutron fluence rate. Such an investigation for an activation in-growth in the spectrum can also be performed on a continuous basis, even while moving in a variable gamma background field.

For such purpose, an energy ratio technique can be used. See U.S. Pat. No. 7,456,405, hereby incorporated by reference in its entirety (however, where anything in the incorporated reference contradicts anything stated in the present application, the present application prevails). The typical scenario for such a neutron alarm during continuous monitoring of the background radiation would be a neutron source that is heavily gamma shielded, so that essentially only slow neutrons are able to escape. Such a source could readily be detected using a dedicated conventional neutron detector, but would be missed by a typical gamma-only personal radiation detector or other gamma search device.

While the detection of neutron activation may be severely hampered in the presence of intense gamma radiation, the presence of such gamma radiation will cause a gamma alarm, which will alert the user, who can then first perform a gamma spectroscopic measurement, and then remove the instrument from the radiation field to perform a subsequent low level measurement, in order to detect the neutron induced radioactivity. For that purpose, it may also be advantageous to place the detector during exposure into a neutron moderator configuration in order to maximize the rate of neutron activation as described below. For that purpose, the scintillator may even be placed into a gamma radiation field that is too high to perform any gamma spectroscopic measurement during the exposure, and the device may even stay switched off during irradiation. Such a confirmation measurement in a gamma shielded location (after a possible exposure to neutron radiation) can be done on a routine basis or the measurement can be triggered by any signature in the gamma spectrum that could originate from prompt gamma radiation from the neutron source or the surrounding material, such as gamma radiation above approximately 3 MeV, or the presence of specific spectral peaks that may relate to neutron capture, such as 477 keV in boron or 2.3 MeV in hydrogen.

In a preferred embodiment, $CeBr_3$ is used as a scintillation crystal. Details regarding this material can be found in U.S. Pat. No. 7,405,404 B1, hereby incorporated by reference in its entirety (however, where anything in the incorporated reference contradicts anything stated in the present application, the present application prevails). This scintillator is a very favorable material for gamma spectroscopy, due to its high density, high photon stopping power, high light output with a fast decay time, and good energy resolution. $CeBr_3$ is preferred over $LaBr_3$, which is an alternative scintillation material containing bromine: $CeBr_3$ can be produced with low concentrations of chemical impurities (among which radio-active material may be present), while $LaBr_3$ always contains naturally occurring radioactive La-138 which interferes with the detection of the neutron induced activity.

Another preferred crystal is Li-6 enriched Ce-doped $Cs_2LiYCl_6$ ("CLYC") or $Cs_2LiLaBr_6$ ("CLLB"), in order to extend the application range of conventional gamma neutron scintillator materials. CLYC based instruments would extend their known application range (detection of low energy neutrons via neutron capture (6Li (n, alpha) 3H) and fast neutrons spectral analysis above approximately 1 Mev (35Cl (n,p))) to scenarios where pulsed radiation or high intensity gamma fields are involved. See U.S. Pat. No. 8,658,983, hereby incorporated by reference in its entirety (however, where anything in the incorporated reference contradicts anything stated in the present application, the present application prevails). CLLB is especially suitable for neutron activation analysis, due to the simultaneous presence of cesium and bromine in the crystal and the corresponding elevated sensitivity.

Figure 5:
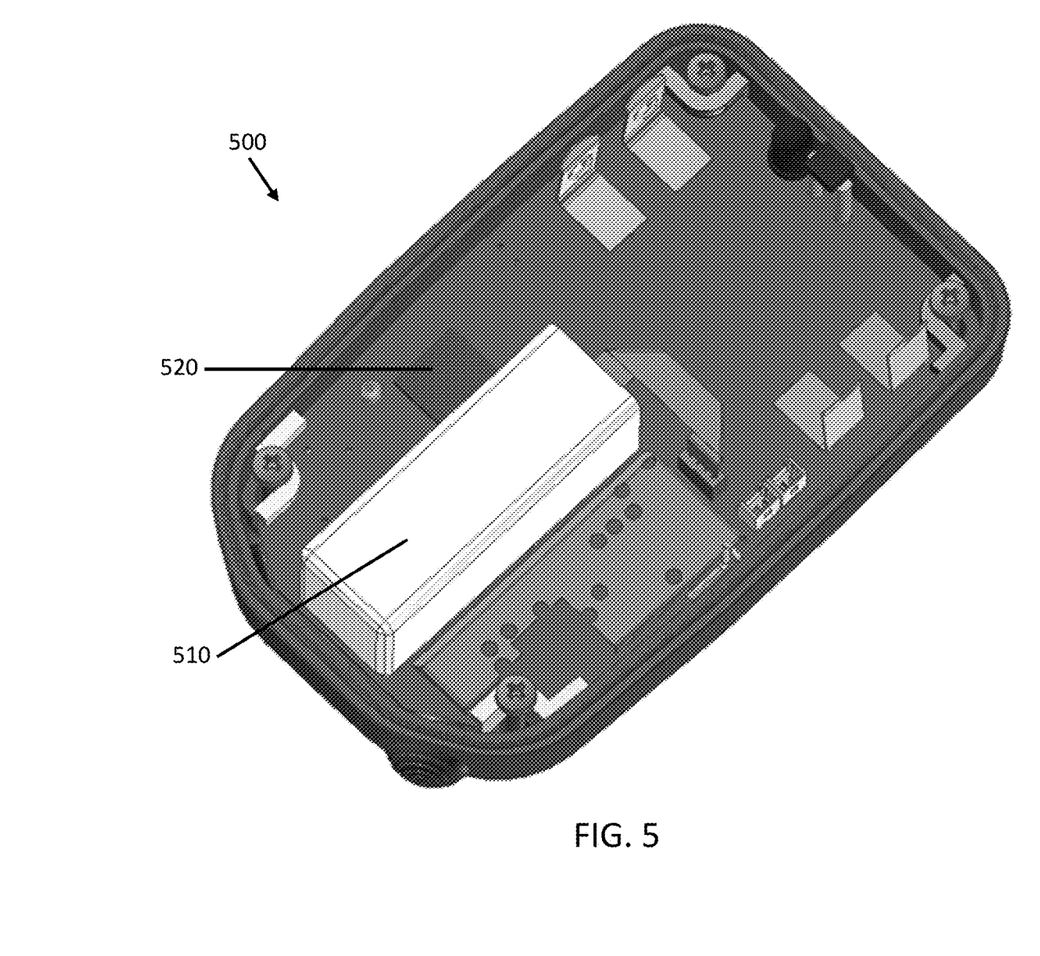
FIG. 5 is a schematic illustration of a gamma radiation detecting device according to an exemplary embodiment of the invention.

In one embodiment shown in FIG. 5, a gamma radiation detecting device 500 includes a scintillation detector 510 that detects gamma radiation, the detector 510 comprising a scintillation material that includes an element that creates, by neutron activation of the element, an isotope that emits gamma radiation, and a processor 520 configured to monitor the gamma radiation emitted by the isotope, thereby detecting exposure of the gamma radiation detecting device 500 to neutron radiation. In some embodiments, the element can be bromine (Br). In these specific embodiments, the isotope can include Br-80m and Br-82m. In certain embodiments, the isotope can further include Br-80 and Br-82, with the processor 520 being further configured to monitor beta radiation emitted by the Br-80 and Br-82 isotopes. In certain other embodiments, the element can be cesium (Cs). In these specific embodiments, the isotope can include Cs-134m. In certain embodiments, the isotope can further include Cs-134, with the processor 520 being further configured to monitor beta radiation emitted by the Cs-134 isotope. The processor 520 can be further configured to monitor persistent gamma radiation emitted by the isotope after exposure of the gamma radiation detecting device 500 to neutron radiation.

Figure 6:
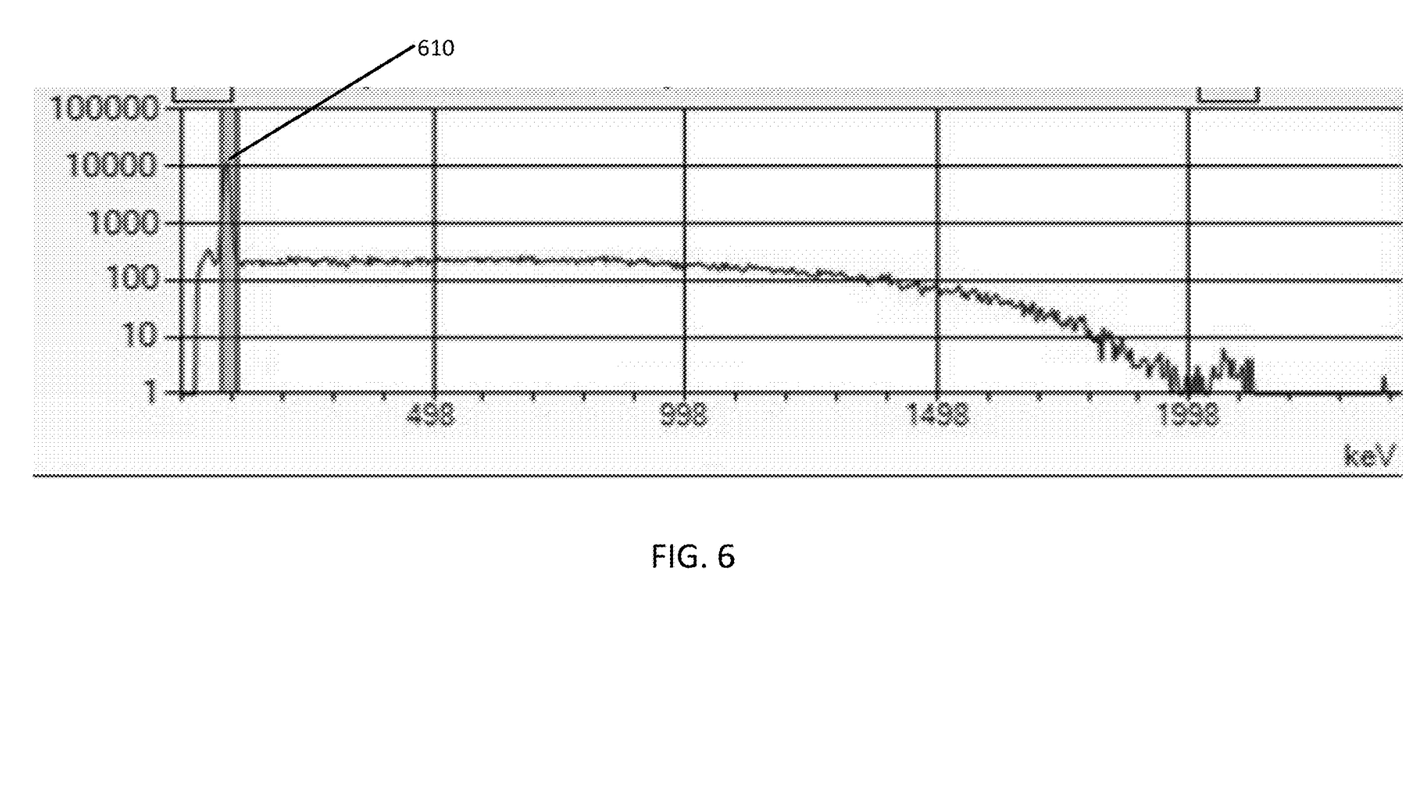
FIG. 6 is a graph of a pulse height spectrum 50 minutes after neutron irradiation of a $CeBr_3$ scintillation crystal.
Figure 7A:
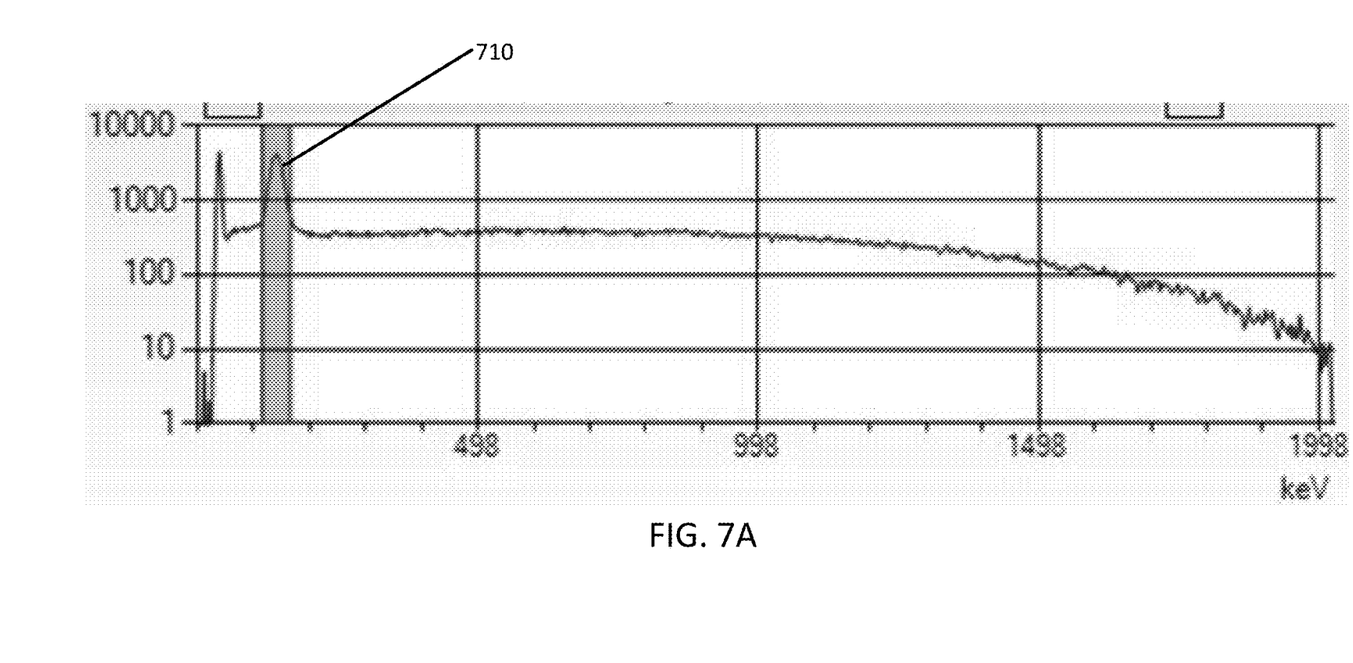
FIG. 7A is a graph of a pulse height spectrum 50 minutes after neutron irradiation of a CsI scintillation crystal.
Figure 7B:
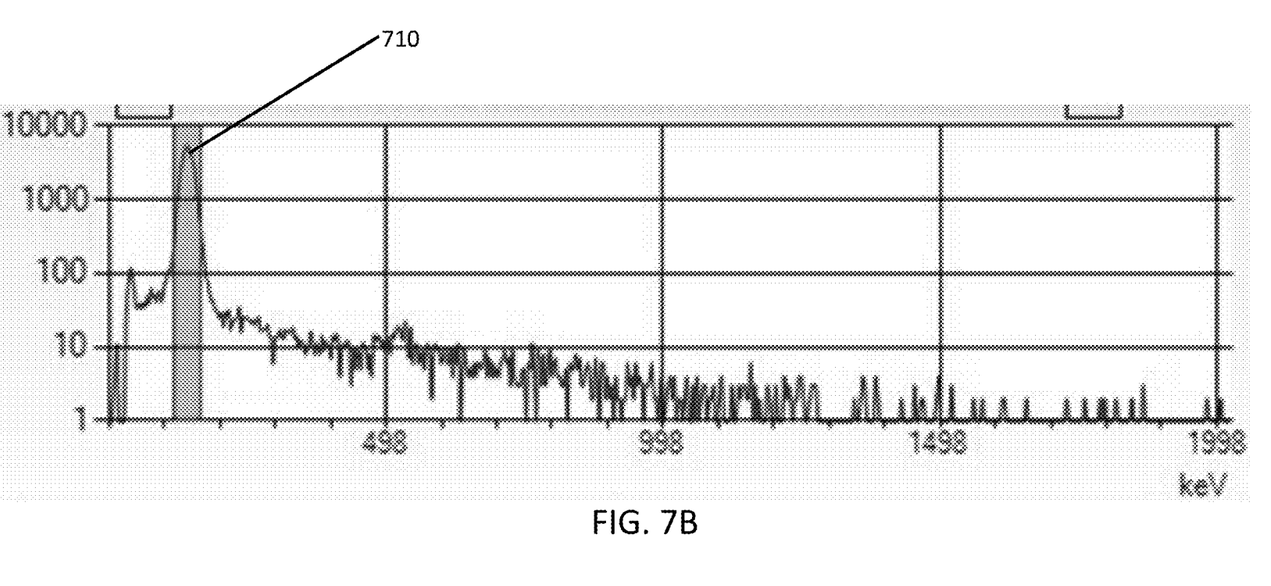
FIG. 7B is a graph of a pulse height spectrum 300 minutes after neutron irradiation of a CsI scintillation crystal.

In some embodiments, the processor 520 can be further configured to monitor a predetermined energy gamma radiation emitted by the isotope. In certain embodiments, the element can be bromine (Br). In these specific embodiments, the isotope can be Br-82m, with the energy of the gamma radiation emitted by the Br-82m isotope being 48 keV, as shown by peak 310 in FIG. 3A, or the isotope can be Br-80m, with the energy of the gamma radiation emitted by the Br-80m isotope being 85 keV, as shown by peak 320 in FIG. 3B, and by the Br-80m 86 keV peak 610 in FIG. 6. In certain other embodiments, the element can be cesium (Cs). In these specific embodiments, the isotope can be Cs-134m, with the energy of the gamma radiation emitted by the Cs-134m isotope being 140 keV, as shown by peak 710 in FIG. 7A. As shown in FIG. 7B, peak 710 of Cs-134m is persistent 300 minutes after neutron irradiation.

Figure 8:
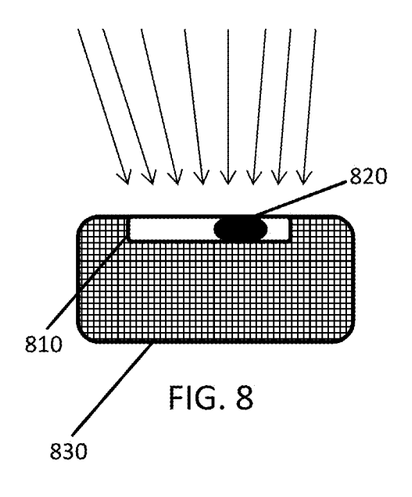
FIG. 8 is a schematic illustration of a gamma radiation detecting device in direct contact with a neutron moderator device according to an exemplary embodiment of the invention.

As shown in FIG. 8, in another embodiment, a gamma radiation detecting device 810 including a scintillation detector 820 further includes a neutron moderator device 830 in direct contact with the gamma radiation detecting device 810 to increase the response to neutron radiation by moderation and backscattering of neutrons (indicated by arrows) impacting the front side of the gamma radiation detecting device 810. The neutron moderator device 830 is made of a material containing predominantly hydrogen, such as at least one of polyethylene (PE), polyvinylchloride (PVC), polymethylmethacrylate (PMMA), and water. The neutron moderator device 830 is a hemispherical enclosure as shown in FIG. 8. In a preferred design, the scintillation detector 820 is embedded into the neutron moderator device 830 on all sides. The thickness of the walls of the neutron moderator device 830 is in a range of between 2 cm and 6 cm, in order to maximize the neutron count rate.

Figure 9:
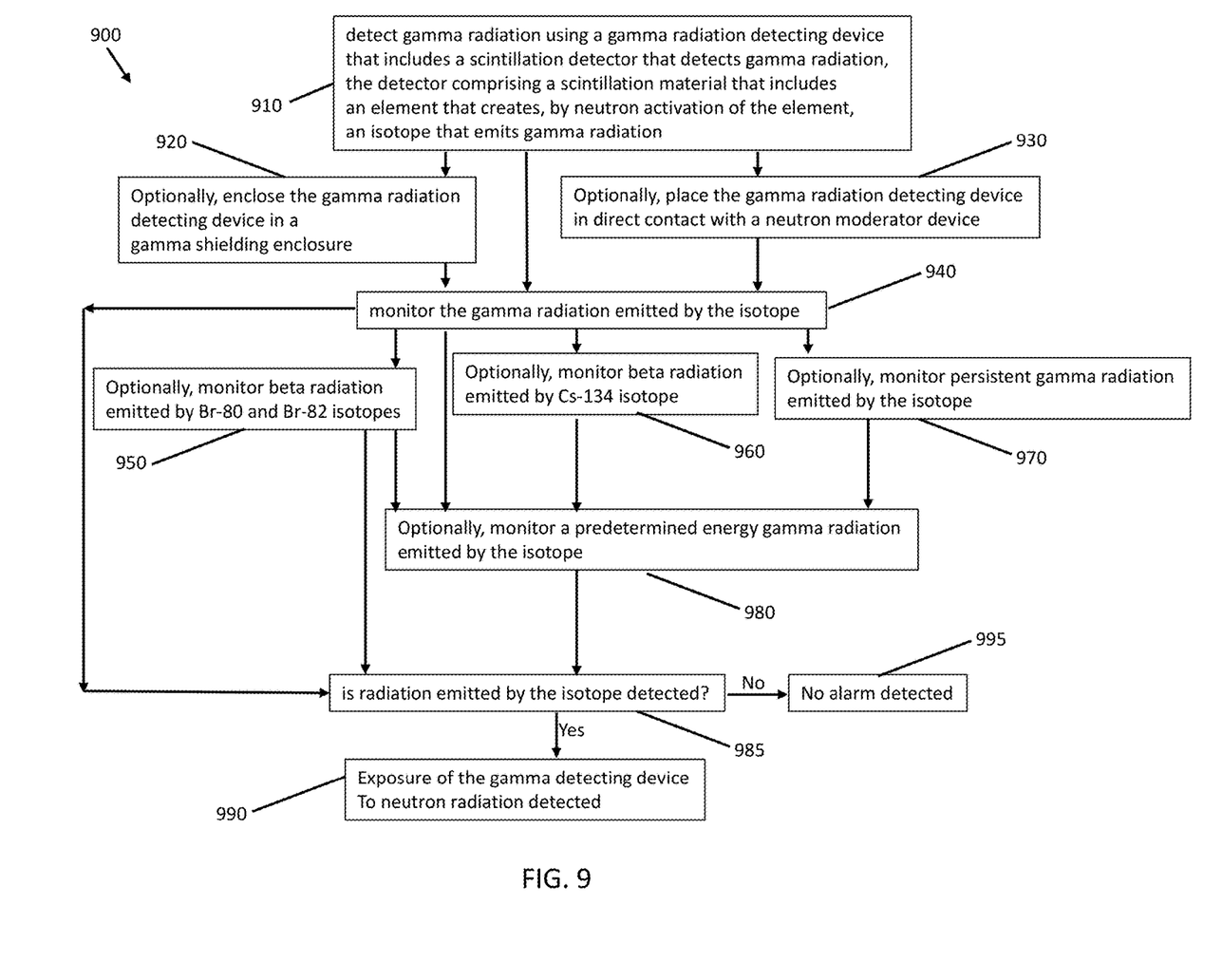
FIG. 9 is a flowchart of a method of detecting neutron radiation according to an exemplary embodiment of the invention.

In another embodiment shown in FIG. 9, a method 900 of detecting neutron radiation includes at step 910 detecting gamma radiation using a gamma radiation detecting device that includes a scintillation detector that detects gamma radiation, the detector comprising a scintillation material that includes an element that creates, by neutron activation of the element, an isotope that emits gamma radiation, and monitoring at step 940 the gamma radiation emitted by the isotope, thereby, if radiation emitted by the isotope is detected at step 985, detecting at step 990 exposure of the gamma radiation detecting device to neutron radiation, otherwise no alarm is detected at step 995. In some embodiments, the element can be bromine (Br). In these specific embodiments, the isotope can include Br-80m and Br-82m. In certain embodiments, the isotope can further include Br-80 and Br-82, with the monitoring step including at step 950 monitoring beta radiation emitted by the Br-80 and Br-82 isotopes. In certain other embodiments, the element can be cesium (Cs). In these specific embodiments, the isotope can include Cs-134m. In certain embodiments, the isotope can further include Cs-134, with the monitoring step including at step 960 monitoring beta radiation emitted by the Cs-134 isotope. The monitoring step can include at step 970 monitoring persistent gamma radiation emitted by the isotope after exposure of the gamma radiation detecting device to neutron radiation.

In some embodiments, the monitoring step can include at step 980 monitoring a predetermined energy gamma radiation emitted by the isotope. In certain embodiments, the element can be bromine (Br). In these specific embodiments, the isotope can be Br-82m, with the energy of the gamma radiation emitted by the Br-82m isotope being 48 keV, or the isotope can be Br-80m, with the energy of the gamma radiation emitted by the Br-80m isotope being 85 keV. In certain other embodiments, the element can be cesium (Cs). In these specific embodiments, the isotope can be Cs-134m, with the energy of the gamma radiation emitted by the Cs-134m isotope being 140 keV.

In certain embodiments, the method can further include at step 930 placing the gamma radiation detecting device in direct contact with a neutron moderator device. The neutron moderator device can include at least one of polyethylene (PE), polymethylmethacrylate (PMMA), and water. In some embodiments, the method can further include at step 920 enclosing the gamma radiation detecting device in a gamma shielding enclosure comprising a high atomic number material. The high atomic number material can be at least one of lead (Pb), tin (Sn), or Tungsten (W).

While the present invention has been illustrated by a description of exemplary embodiments and while these embodiments have been described in considerable detail, it is not the intention of the applicant to restrict or in any way limit the scope of the appended claims to such detail. Additional advantages and modifications will readily appear to those skilled in the art. The invention in its broader aspects is therefore not limited to the specific details, representative apparatus and method, and illustrative example shown and described. Accordingly, departures may be made from such details without departing from the spirit or scope of applicant's general inventive concept.

What is claimed is:

1. A gamma radiation detecting device comprising:
   a. a scintillation detector that detects gamma radiation, the detector comprising a scintillation material that includes an element that creates, by neutron activation of the element, an isotope that emits gamma radiation, wherein the element is bromine (Br) and the isotope is Br-80 m or Br-82 m; and
   b. a processor configured to monitor the gamma radiation emitted by the isotope, there by detecting exposure of the gamma radiation detecting device to neutron radiation.

2. The device of claim 1, wherein the isotope further includes Br-80.

3. The device of claim 2, wherein the processor is further configured to monitor beta radiation emitted by the Br-80 isotope.

4. The device of claim 1, wherein the isotope further includes Br-82.

5. The device of claim 4, wherein the processor is further configured to monitor beta radiation emitted by the Br-82 isotope.

6. The device of claim 1, wherein the processor is further configured to monitor a predetermined energy gamma radiation emitted by the isotope.

7. The device of claim 6, wherein the energy of the gamma radiation emitted by the Br-82 m isotope is 48 keV.

8. The device of claim 6, wherein the energy of the gamma radiation emitted by the Br-80 m isotope is 85 keV.

9. The device of claim 1, wherein the processor is further configured to monitor persistent gamma radiation emitted by the isotope after exposure of the gamma radiation detecting device to neutron radiation.

10. The device of claim 1, further including a neutron moderator device in direct contact with the gamma radiation detecting device.

11. The device of claim 10, wherein the neutron moderator device comprises at least one of polyethylene (PE), polyvinylchloride (PVC), polymethylmethacrylate (PMMA), and water.

12. A method of detecting neutron radiation, the method comprising:
    a. detecting gamma radiation using a gamma radiation detecting device that includes a scintillation detector that detects gamma radiation, the detector comprising a scintillation material that includes an element that creates, by neutron activation of the element, an isotope that emits gamma radiation, wherein the element is bromine (Br) and the isotope is Br-80 m or Br-82 m; and
    b. monitoring the gamma radiation emitted by the isotope, thereby detecting exposure of the gamma radiation detecting device to neutron radiation.

13. The method of claim 12, wherein the isotope includes Br-80 and the monitoring step includes monitoring beta radiation energy emitted by the Br-80 isotope.

14. The method of claim 12, wherein the isotope includes Br-82 and the monitoring step includes monitoring beta radiation energy emitted by the Br-82 isotope.

15. The method of claim 12, wherein monitoring the gamma radiation emitted by the isotope includes monitoring a predetermined energy gamma radiation emitted by the isotope.

16. The method of claim 15, wherein the monitoring step includes monitoring 48 keV gamma radiation emitted by the Br-82 m isotope.

17. The method of claim 15, wherein the monitoring step includes monitoring 85 keV gamma radiation emitted by the Br-80 m isotope.

18. The method of claim 12, wherein monitoring the gamma radiation emitted by the isotope includes monitoring persistent gamma radiation emitted after exposure of the gamma radiation detecting device to neutron radiation.

19. The method of claim 12, further including placing the gamma radiation detecting device in direct contact with a neutron moderator device.

20. The method of claim 19, wherein the neutron moderator device comprises at least one of polyethylene (PE), polyvinylchloride (PVC), polymethylmethacrylate (PMMA), and water.

21. The method of claim 12, further including enclosing the gamma radiation detecting device in a gamma shielding enclosure comprising a high atomic number material.

22. The method of claim 21, wherein the high atomic number material is at least one of lead (Pb), tin (Sn), or Tungsten (W).

* * * * *

UNITED STATES PATENT AND TRADEMARK OFFICE
CERTIFICATE OF CORRECTION

PATENT NO. : 10,527,743 B2
APPLICATION NO. : 15/812012
DATED : January 7, 2020
INVENTOR(S) : Michael Iwatschenko-Borho et al.

Page 1 of 1

It is certified that error appears in the above-identified patent and that said Letters Patent is hereby corrected as shown below:

Claim 1, Column 10, Line 2: replace "there by" with -- thereby --

Signed and Sealed this
Twenty-sixth Day of May, 2020

Andrei Iancu
*Director of the United States Patent and Trademark Office*